(12) United States Patent
Ishizeki

(10) Patent No.: US 11,485,191 B2
(45) Date of Patent: Nov. 1, 2022

(54) VEHICULAR AIR CONDITIONING DEVICE

(71) Applicant: SANDEN AUTOMOTIVE CLIMATE SYSTEMS CORPORATION, Isesaki (JP)

(72) Inventor: Tetsuya Ishizeki, Isesaki (JP)

(73) Assignee: SANDEN AUTOMOTIVE CLIMATE SYSTEMS CORPORATION, Isesaki (JP)

( * ) Notice: Subject to any disclaimer, the term of this patent is extended or adjusted under 35 U.S.C. 154(b) by 501 days.

(21) Appl. No.: 16/606,563

(22) PCT Filed: Mar. 9, 2018

(86) PCT No.: PCT/JP2018/010362
§ 371 (c)(1),
(2) Date: Oct. 18, 2019

(87) PCT Pub. No.: WO2018/193770
PCT Pub. Date: Oct. 25, 2018

(65) Prior Publication Data
US 2020/0122544 A1 Apr. 23, 2020

(30) Foreign Application Priority Data

Apr. 18, 2017 (JP) .............................. JP2017-081934

(51) Int. Cl.
*B60H 1/00* (2006.01)
*B60H 1/14* (2006.01)
*B60H 1/32* (2006.01)

(52) U.S. Cl.
CPC ......... *B60H 1/00278* (2013.01); *B60H 1/143* (2013.01); *B60H 1/323* (2013.01)

(58) Field of Classification Search
CPC ..... B60H 1/00278; B60H 1/143; B60H 1/323
(Continued)

(56) References Cited

U.S. PATENT DOCUMENTS 6,077,158 A * 6/2000 Lake .................. B60H 1/00278
454/70
10,137,758 B2 * 11/2018 Yokoo ................ B60H 1/00907
(Continued)

FOREIGN PATENT DOCUMENTS

EP 3 165 846 B1 5/2017
JP 2012-236577 A 12/2012
(Continued)

OTHER PUBLICATIONS

Japan Patent Office, International Search Report issued in International Application No. PCT/JP2018/010362, dated Jun. 19, 2018.
(Continued)

*Primary Examiner* — Davis D Hwu
(74) *Attorney, Agent, or Firm* — Baker Botts L.L.P.

(57) ABSTRACT

A vehicular air conditioning device is provided which is capable of cooling a heat medium of a battery temperature adjustment device by a refrigerant in a refrigerant circuit to improve operation efficiency when a battery is to be cooled. The vehicular air conditioning device includes a battery temperature adjustment device (61) for circulating a heat medium in a battery (55) to cool the same, a refrigerant-heat medium heat exchanger (64) for exchanging heat between at least part of the refrigerant flowing out from an outdoor heat exchanger (7) and the heat medium circulating in the battery temperature adjustment device, and an auxiliary expansion valve (73) for decompressing the refrigerant flowing into the refrigerant-heat medium heat exchanger. A control device controls a compressor (2) or the auxiliary expansion valve on the basis of a temperature Tw of the refrigerant of the refrigerant-heat medium heat exchanger to thereby adjust a battery temperature Tb to a target battery temperature TBO.

14 Claims, 6 Drawing Sheets

(58) Field of Classification Search
USPC .......................................................... 429/62
See application file for complete search history.

(56) References Cited

U.S. PATENT DOCUMENTS

| | | |
|---|---|---|
| 10,525,792 B2 * | 1/2020 | Suzuki ................. B60H 1/3229 |
| 2015/0191072 A1 | 7/2015 | Inoue et al. |
| 2016/0185185 A1 | 6/2016 | Suzuki et al. |

FOREIGN PATENT DOCUMENTS

| | | |
|---|---|---|
| JP | 2013-154805 A | 8/2013 |
| JP | 2014-037959 A | 2/2014 |
| JP | 2014-213765 A | 11/2014 |
| JP | 2015-191703 A | 11/2015 |
| JP | 5860360 B2 | 2/2016 |
| WO | 2016/002052 A1 | 1/2016 |

OTHER PUBLICATIONS

Japan Patent Office, Notice of Reasons for Refusal issued in Japanese Patent Application No. 2017-081934, dated Apr. 6, 2021.

* cited by examiner

VEHICULAR AIR CONDITIONING DEVICE

CROSS-REFERENCE TO RELATED APPLICATIONS

This application is a U.S. National Stage Patent Application under 37 U.S.C. § 371 of International Patent Application No. PCT/JP2018/010362, filed on Mar. 9, 2018, which claims the benefit of Japanese Patent Application No. JP 2017-081934, filed on Apr. 18, 2017, the disclosures of each of which are incorporated herein by reference in their entirety.

TECHNICAL FIELD

The present invention relates to an air conditioner of a heat pump system which conditions air of a vehicle interior of a vehicle, and more particularly, it relates to a vehicular air conditioning device which is suitable for a hybrid car and an electric vehicle each having a battery.

BACKGROUND ART

Due to actualization of environmental problems in recent years, hybrid cars and electric vehicles each of which drives a motor for running by power supplied from a battery have spread. Further, as an air conditioning device which is applicable to such a vehicle, there has been developed an air conditioning device which includes a refrigerant circuit to which a compressor to compress and discharge a refrigerant, a radiator disposed on a vehicle interior side to let the refrigerant radiate heat, a heat absorber disposed on the vehicle interior side to let the refrigerant absorb heat, and an outdoor heat exchanger disposed outside the vehicle interior to let outdoor air flow and let the refrigerant absorb or radiate heat are connected, and which changes and executes a heating mode to let the refrigerant discharged from the compressor radiate heat in the radiator and let the refrigerant from which the heat has been radiated in the radiator absorb heat in the outdoor heat exchanger, and a cooling mode to let the refrigerant discharged from the compressor radiate heat in the outdoor heat exchanger and let the refrigerant absorb heat in the heat absorber (refer to, for example, Patent Document 1).

On the other hand, the battery becomes high in temperature during its charging, or due to self-heating during its discharging. There is a risk that when the charging/discharging of the battery is performed under such circumstances, its deterioration progresses and soon the battery causes an operation failure to lead to breakage. Thus, there has also been developed a battery capable of being cooled by circulating in the battery, cooling water (heat medium) to exchange heat with a refrigerant circulated in a refrigerant circuit (refer to, for example, Patent Document 2).

CITATION LIST

Patent Documents

Patent Document 1: Japanese Patent Application Publication No. 2014-213765
Patent Document 2: Japanese Patent No. 5860360

SUMMARY OF THE INVENTION

Problems to be Solved by the Invention

Here, in Patent Document 2 described above, a compression part (a compressor) in an aircon cycle (the refrigerant circuit) has been controlled based on the temperature of the cooling water circulated in a low water temperature loop. The cooling water and a pipe which constitutes the low water temperature loop have however heat capacity. Thus, as in the conventional art, when the temperature of the cooling water is detected, and the compression part (the compressor) is controlled such that the temperature of the cooling water becomes a target battery temperature TBO (a target value of the temperature of the battery, which is +35° C., for example), it takes time until the temperature of a refrigerant flowing through a battery heat exchange part (a chiller: refrigerant-heat medium heat exchanger) for cooling the cooling water is reflected on the cooling water circulated in the low water temperature loop, thereby causing a lag in the control of the compression part (the compressor).

Thus, a problem arises in that the amount of control (the number of revolutions) of the compression part (the compressor) greatly fluctuates as indicated by a broken line L4 in FIG. 6, and wasteful power is consumed, and undershoots and overshoots (shown by hatching) are greatly repeated as indicated by a broken line L2 in FIG. 5 even in terms of a temperature Tb of the battery.

The present invention has been developed to solve such conventional technical problems, and an object thereof is to provide a vehicular air conditioning device capable of cooling a heat medium of a battery temperature adjustment device by a refrigerant of a refrigerant circuit and improving operation efficiency when a battery is cooled.

Means for Solving the Problems

A vehicular air conditioning device of the present invention conditions air of a vehicle interior, including a refrigerant circuit to let a refrigerant circulate in the order of a compressor, a heat exchanger for heat radiation, a pressure reducing unit, and a heat exchanger for heat absorption, and a control device. The vehicular air conditioning device is characterized by having a battery temperature adjustment device to circulate a heat medium through a battery mounted in a vehicle, thereby cooling the battery, a refrigerant-heat medium heat exchanger to exchange heat between at least part of the refrigerant flowing out from the heat exchanger for heat radiation and the heat medium of the battery temperature adjustment device, and an expansion valve to decompress the refrigerant flowing into the refrigerant-heat medium heat exchanger and in that the control device controls the compressor or the expansion valve on the basis of a temperature Tw of the refrigerant of the refrigerant-heat medium heat exchanger to thereby adjust a temperature Tb of the battery to a predetermined target value TBO.

The vehicular air conditioning device of the invention of claim 2 is characterized in that in the above invention, the control device sets a temperature of the refrigerant in an inlet of the refrigerant-heat medium heat exchanger or a temperature converted from a pressure of the refrigerant in the inlet of the refrigerant-heat medium heat exchanger, or a temperature of the refrigerant in an outlet of the refrigerant-heat medium heat exchanger or a temperature converted from a pressure of the refrigerant in the outlet of the refrigerant-heat medium heat exchanger as the temperature Tw of the refrigerant of the refrigerant-heat medium heat exchanger.

The vehicular air conditioning device of the invention of claim 3 is characterized in that in the above respective inventions, the control device sets the target value TBO of the temperature Tb of the battery as a target value TWO of the temperature Tw of the refrigerant of the refrigerant-heat medium heat exchanger, and controls the compressor or the expansion valve on the basis of the target value TWO and the temperature Tw of the refrigerant of the refrigerant-heat medium heat exchanger, and the control device corrects the target value TWO of the temperature Tw of the refrigerant of the refrigerant-heat medium heat exchanger on the basis of the degree of lowering of the temperature Tb of the battery.

The vehicular air conditioning device of the invention of claim 4 is characterized in that in the above respective inventions, it includes an air flow passage through which air to be supplied to the vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, and an outdoor heat exchanger disposed outside the vehicle interior to let the refrigerant radiate or absorb heat, and the control device executes a heating mode to let the refrigerant discharged from the compressor radiate heat in the radiator, decompress the refrigerant from which the heat has been radiated, and then let the refrigerant absorb heat in the outdoor heat exchanger, thereby heating the vehicle interior, a dehumidifying mode to let the refrigerant discharged from the compressor radiate heat in the radiator and the outdoor heat exchanger, decompress the refrigerant from which the heat has been radiated, and then let the refrigerant absorb heat in the heat absorber, thereby dehumidifying the vehicle interior, and a cooling mode to let the refrigerant discharged from the compressor radiate heat in the outdoor heat exchanger, decompress the refrigerant from which the heat has been radiated, and then let the refrigerant absorb heat in the heat absorber, thereby cooling the vehicle interior, and in the cooling mode and/or the dehumidifying mode, the heat absorber constitutes the heat exchanger for heat absorption, the outdoor heat exchanger constitutes the heat exchanger for heat radiation, and at least part of the refrigerant flowing out from the outdoor heat exchanger is decompressed in the expansion valve and made to flow into the refrigerant-heat medium heat exchanger.

The vehicular air conditioning device of the invention of claim 5 is characterized in that in the above respective inventions, the control device controls an operation of the compressor on the basis of a temperature Te of the heat exchanger for heat absorption, and controls a valve position of the expansion valve on the basis of the temperature Tw of the refrigerant of the refrigerant-heat medium heat exchanger.

The vehicular air conditioning device of the invention of claim 6 is characterized in that in the above invention, the control device controls the operation of the compressor according to a target number of revolutions TGNCte of the compressor calculated based on the temperature Te of the heat exchanger for heat absorption, and when the target number of revolutions TGNCte is lowered to a predetermined low value, the control device stops the supply of the refrigerant to the heat exchanger for heat absorption, and controls the operation of the compressor according to a target number of revolutions TGNCtw of the compressor calculated based on the temperature Tw of the refrigerant of the refrigerant-heat medium heat exchanger.

The vehicular air conditioning device of the invention of claim 7 is characterized in that in the inventions of claims 1 to 4, the control device controls the operation of the compressor on the basis of the temperature Tw of the refrigerant of the refrigerant-heat medium heat exchanger, and controls the valve position of the expansion valve on the basis of the temperature Te of the heat exchanger for heat absorption.

The vehicular air conditioning device of the invention of claim 8 is characterized in that in the above invention, the control device controls the operation of the compressor according to the target number of revolutions TGNCtw of the compressor calculated based on the temperature Tw of the refrigerant of the refrigerant-heat medium heat exchanger, and when the target number of revolutions TGNCtw is lowered to a predetermined low value, the control device stops the supply of the refrigerant to the refrigerant-heat medium heat exchanger, and controls the operation of the compressor according to the target number of revolutions TGNCte of the compressor calculated based on the temperature Te of the heat exchanger for heat absorption.

The vehicular air conditioning device of the invention of claim 9 is characterized in that in the inventions of claims 1 to 4, the control device selects a smaller number of revolutions from the target number of revolutions TGNCte of the compressor calculated based on the temperature Te of the heat exchanger for heat absorption, and the target number of revolutions TGNCtw of the compressor calculated based on the temperature Tw of the refrigerant of the refrigerant-heat medium heat exchanger to control the operation of the compressor, and the control device controls the valve position of the expansion valve on the basis of the temperature Tw of the refrigerant of the refrigerant-heat medium heat exchanger or the temperature Te of the heat exchanger for heat absorption, which is not selected for the operation control of the compressor.

Advantageous Effect of the Invention

According to the present invention, in a vehicular air conditioning device to condition air of a vehicle interior, including a refrigerant circuit to let a refrigerant circulate in the order of a compressor, a heat exchanger for heat radiation, a pressure reducing unit, and a heat exchanger for heat absorption, and a control device, there are provided a battery temperature adjustment device to circulate a heat medium through a battery mounted in a vehicle, thereby cooling the battery, a refrigerant-heat medium heat exchanger to exchange heat between at least part of the refrigerant flowing out from the heat exchanger for heat radiation and the heat medium of the battery temperature adjustment device, and an expansion valve to decompress the refrigerant flowing into the refrigerant-heat medium heat exchanger. The control device controls the compressor or the expansion valve on the basis of a temperature Tw of the refrigerant of the refrigerant-heat medium heat exchanger to thereby adjust a temperature Tb of the battery to a predetermined target value TBO. It is therefore possible to eliminate the disadvantage that as in the case where the compressor is controlled with the temperature of the heat medium circulated in the battery temperature adjustment device, wasteful power is consumed in the compressor due to a lag in the control generated by the battery temperature adjustment device or the heat capacity of the heat medium. Consequently, it is possible to cool the battery efficiently by using the refrigerant circuit for conditioning air in the vehicle interior. In particular, since at least part of the refrigerant flowing out from the heat exchanger for heat radiation is decompressed by the expansion valve and made to flow into the refrigerant-heat medium heat exchanger, the temperature Tb of the battery can be accurately and efficiently adjusted to the target value TBO.

Here, as in the invention of claim 2, a temperature of the refrigerant in an inlet of the refrigerant-heat medium heat exchanger or a temperature converted from a pressure of the refrigerant in the inlet of the refrigerant-heat medium heat exchanger, or a temperature of the refrigerant in an outlet of the refrigerant-heat medium heat exchanger or a temperature converted from a pressure of the refrigerant in the outlet of the refrigerant-heat medium heat exchanger can be adopted as the temperature Tw of the refrigerant of the refrigerant-heat medium heat exchanger.

Further, as in the invention of claim 3, the control device sets the target value TBO of the temperature Tb of the battery as a target value TWO of the temperature Tw of the refrigerant of the refrigerant-heat medium heat exchanger, and controls the compressor or the expansion valve on the basis of the target value TWO and the temperature Tw of the refrigerant of the refrigerant-heat medium heat exchanger, whereby the temperature Tb of the battery can suitably be adjusted to the target value TBO. However, if the control device corrects the target value TWO of the temperature Tw of the refrigerant of the refrigerant-heat medium heat exchanger on the basis of the degree of lowering of the temperature Tb of the battery, it is possible to adjust the temperature Tb of the battery to the target value TBO more quickly.

In the above, as in the invention of claim 4, for example, there are provided an air flow passage through which air to be supplied to the vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, and an outdoor heat exchanger disposed outside the vehicle interior to let the refrigerant radiate or absorb heat. The control device executes a heating mode to let the refrigerant discharged from the compressor radiate heat in the radiator, decompress the refrigerant from which the heat has been radiated, and then let the refrigerant absorb heat in the outdoor heat exchanger, thereby heating the vehicle interior, a dehumidifying mode to let the refrigerant discharged from the compressor radiate heat in the radiator and the outdoor heat exchanger, decompress the refrigerant from which the heat has been radiated, and then let the refrigerant absorb heat in the heat absorber, thereby dehumidifying the vehicle interior, and a cooling mode to let the refrigerant discharged from the compressor radiate heat in the outdoor heat exchanger, decompress the refrigerant from which the heat has been radiated, and then let the refrigerant absorb heat in the heat absorber, thereby cooling the vehicle interior. Further, in the cooling mode and/or the dehumidifying mode, the heat absorber constitutes the heat exchanger for heat absorption, the outdoor heat exchanger constitutes the heat exchanger for heat radiation, and at least part of the refrigerant flowing out from the outdoor heat exchanger is decompressed in the expansion valve and made to flow into the refrigerant-heat medium heat exchanger. Consequently, in an environment where the temperature of the battery is easily raised, the heat medium circulated in the battery temperature adjustment device is efficiently cooled by the refrigerant of the refrigerant circuit to enable the battery to be cooled.

In this case, as in the invention of claim 5, the control device may control an operation of the compressor on the basis of a temperature Te of the heat exchanger for heat absorption, and control a valve position of the expansion valve on the basis of the temperature Tw of the refrigerant of the refrigerant-heat medium heat exchanger. As in the invention of claim 7, the control device may control the operation of the compressor on the basis of the temperature Tw of the refrigerant of the refrigerant-heat medium heat exchanger, and control the valve position of the expansion valve on the basis of the temperature Te of the heat exchanger for heat absorption.

Then, in the case of the invention of claim 5, as in the invention of claim 6, the control device performs changing to control the operation of the compressor according to a target number of revolutions TGNCte of the compressor calculated based on the temperature Te of the heat exchanger for heat absorption, and when the target number of revolutions TGNCte is lowered to a predetermined low value, stop the supply of the refrigerant to the heat exchanger for heat absorption, and control the operation of the compressor according to a target number of revolutions TGNCtw of the compressor calculated based on the temperature Tw of the refrigerant of the refrigerant-heat medium heat exchanger. Thus, in the circumstance that there is no need for cooling of the vehicle interior by the heat exchanger for heat absorption, the control device performs changing to a state in which the refrigerant circuit is used only for the cooling of the battery, thereby making it possible to continue the cooling of the battery without hindrance.

On the other hand, in the case of claim 7, as in the invention of claim 8, the control device performs changing to control the operation of the compressor according to the target number of revolutions TGNCtw of the compressor calculated based on the temperature Tw of the refrigerant of the refrigerant-heat medium heat exchanger, and when the target number of revolutions TGNCtw is lowered to a predetermined low value, stop the supply of the refrigerant to the refrigerant-heat medium heat exchanger, and control the operation of the compressor according to the target number of revolutions TGNCte of the compressor calculated based on the temperature Te of the heat exchanger for heat absorption. Thus, in the circumstance that there is no need for cooling of the battery through the heat medium by the refrigerant-heat medium heat exchanger, the control device performs changing to a state in which the refrigerant circuit is used only for the cooling of the vehicle interior, thereby making it possible to continue the air conditioning of the vehicle interior without hindrance.

Further, as in the invention of claim 9, if the control device selects a smaller number of revolutions from the target number of revolutions TGNCte of the compressor calculated based on the temperature Te of the heat exchanger for heat absorption, and the target number of revolutions TGNCtw of the compressor calculated based on the temperature Tw of the refrigerant of the refrigerant-heat medium heat exchanger to control the operation of the compressor, the valve position of the expansion valve is controlled based on the temperature Tw of the refrigerant of the refrigerant-heat medium heat exchanger or the temperature Te of the heat exchanger for heat absorption, which is not selected for the operation control of the compressor, while reducing power consumption of the compressor, thereby making it possible to perform air conditioning of the vehicle interior and the cooling of the battery without hindrance.

MODE FOR CARRYING OUT THE INVENTION

Hereinafter, description will be made as to embodiments of the present invention in detail with reference to the drawings.

Figure 1:
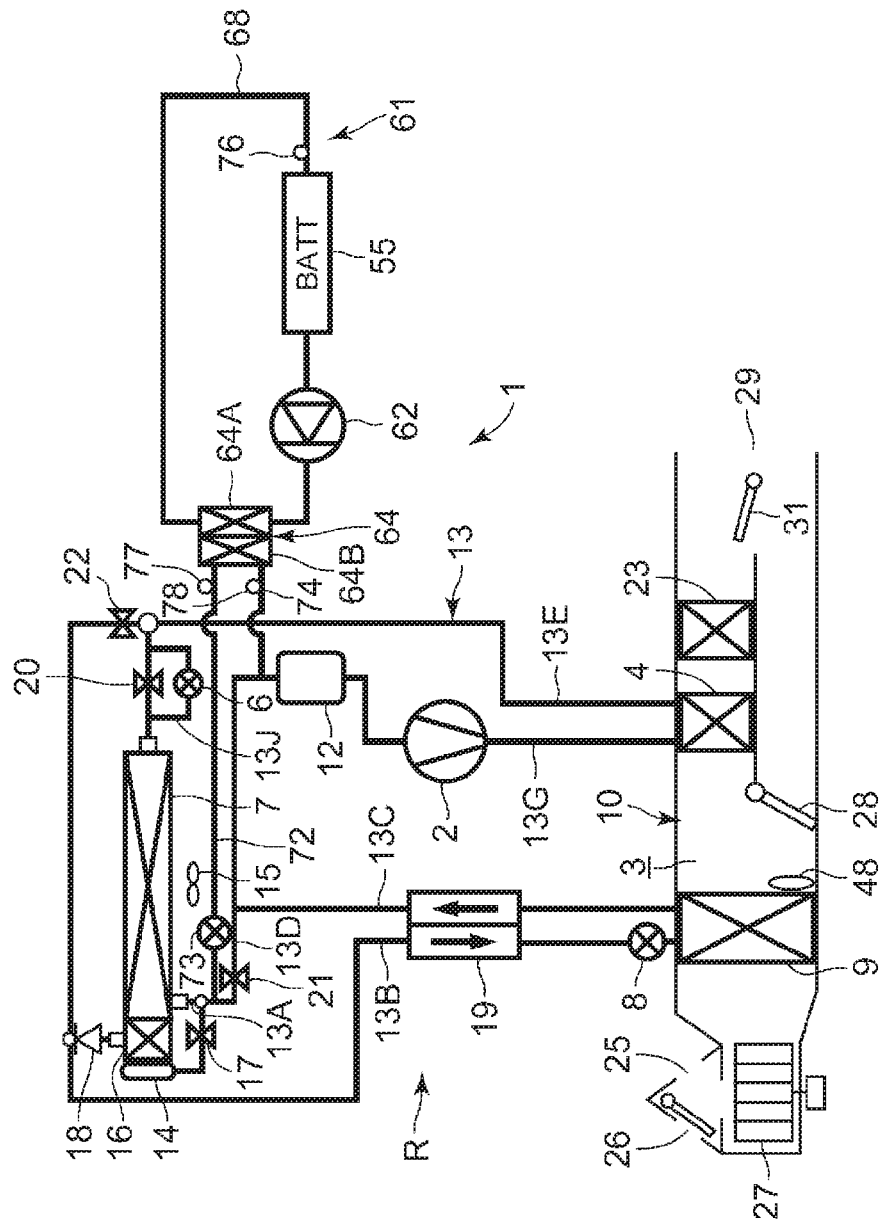
FIG. 1 is a constitutional view of a vehicular air conditioning device of an embodiment to which the present invention is applied.

FIG. 1 illustrates a constitutional view of a vehicular air conditioning device 1 of an embodiment of the present invention. A vehicle of the embodiment to which the present invention is applied is an electric vehicle (EV) in which an engine (an internal combustion engine) is not mounted, and is provided with a battery 55 and runs with an electric motor for running (not shown in the drawing) which is driven by being supplied with power charged in the battery 55. The vehicular air conditioning device 1 of the present invention is also driven by the power of the battery 55.

That is, in the electric vehicle which is not capable of performing heating by engine waste heat, the vehicular air conditioning device 1 of the embodiment performs a heating mode by a heat pump operation in which a refrigerant circuit R is used. Further, the vehicular air conditioning device 1 selectively executes respective operation modes of a dehumidifying and heating mode, an internal cycle mode, a dehumidifying and cooling mode (dehumidifying mode in the present invention), and a cooling mode to perform air conditioning of a vehicle interior.

Incidentally, the vehicle is not limited to the electric vehicle, and the present invention is also effective for a so-called hybrid car in which the engine is used together with the electric motor for running. Further, it is needless to say that the present invention is also applicable to a usual car which runs with the engine.

The vehicular air conditioning device 1 of the embodiment performs air conditioning (heating, cooling, dehumidifying, and ventilation) of the vehicle interior of the electric vehicle. An electric type of compressor 2 to compress a refrigerant, a radiator 4 which functions as a heat exchanger for heat radiation provided in an air flow passage 3 of an HVAC unit 10 in which air supplied to the vehicle interior is ventilated and circulated, to let the high-temperature high-pressure refrigerant discharged from the compressor 2 flow therein via a refrigerant pipe 13G and to let the refrigerant radiate heat to the vehicle interior, an outdoor expansion valve 6 as a pressure reducing unit constituted of an electric valve which decompresses and expands the refrigerant during the heating, an outdoor heat exchanger 7 which performs heat exchange between the refrigerant and outdoor air to function as a heat exchanger for heat radiation during the cooling and dehumidifying and to function as a heat exchanger for heat absorption during the heating, an indoor expansion valve 8 as a pressure reducing unit constituted of an electric valve (which may be a mechanical expansion valve) to decompress and expand the refrigerant, a heat absorber 9 as a heat exchanger for heat absorption provided in the air flow passage 3 to let the refrigerant absorb heat during the cooling and dehumidifying from interior and exterior of the vehicle, an accumulator 12, and others are successively connected by a refrigerant pipe 13, whereby a refrigerant circuit R is constituted.

Incidentally, an outdoor blower 15 is provided in the outdoor heat exchanger 7. The outdoor blower 15 forcibly passes the outdoor air through the outdoor heat exchanger 7 to thereby perform the heat exchange between the outdoor air and the refrigerant, whereby the outdoor air is made to pass through the outdoor heat exchanger 7 even during stopping of the vehicle (i.e., its velocity is 0 km/h).

Further, the outdoor heat exchanger 7 has a receiver drier portion 14 and a subcooling portion 16 successively on a refrigerant downstream side. A refrigerant pipe 13A connected to a refrigerant outlet side of the outdoor heat exchanger 7 is connected to the receiver drier portion 14 via a solenoid valve 17 as an opening/closing valve to be opened during the cooling. An outlet of the subcooling portion 16 is connected to the indoor expansion valve 8 via a check valve 18. Incidentally, the receiver drier portion 14 and the subcooling portion 16 structurally constitute a part of the outdoor heat exchanger 7. The check valve 18 has an indoor expansion valve 8 side which serves as a forward direction.

Additionally, a refrigerant pipe 13B between the check valve 18 and the indoor expansion valve 8 is provided in a heat exchange relation with a refrigerant pipe 13C located on an outlet side of the heat absorber 9, and both the pipes constitute an internal heat exchanger 19. Consequently, the refrigerant flowing into the indoor expansion valve 8 through the refrigerant pipe 13B is made to be cooled (subcooled) by the low-temperature refrigerant flowing out from the heat absorber 9.

In addition, the refrigerant pipe 13A extending out from the outdoor heat exchanger 7 branches, and this branching refrigerant pipe 13D communicates and connects with the refrigerant pipe 13C on a downstream side of the internal heat exchanger 19 via a solenoid valve 21 as an opening/closing valve to be opened during the heating. The refrigerant pipe 13C is connected to the accumulator 12, and the accumulator 12 is connected to a refrigerant suction side of the compressor 2.

Further, a refrigerant pipe 13E on an outlet side of the radiator 4 branches to a refrigerant pipe 13J and a refrigerant pipe 13F before the outdoor expansion valve 6. One branching refrigerant pipe 13J is connected to a refrigerant inlet of the outdoor heat exchanger 7 via the outdoor expansion valve 6. Additionally, the other branching refrigerant pipe 13F communicates and connects with the refrigerant pipe 13B on a downstream side of the check valve 18 via a solenoid valve 22 as an opening/closing valve to be opened during the dehumidifying. Consequently, the refrigerant pipe 13F is connected in parallel with a series circuit of the outdoor expansion valve 6 and the outdoor heat exchanger 7. The solenoid valve 20 as an opening/closing valve for bypass is connected in parallel with the outdoor expansion valve 6.

Additionally, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air of the vehicle interior (indoor air circulation) and outdoor air which is air outside the vehicle interior (outdoor air introduction). Furthermore, on an air downstream side of the suction changing damper 26, an indoor blower (a blower fan) 27 is disposed to supply the introduced indoor or outdoor air to the air flow passage 3.

Furthermore, in FIG. 1, 23 denotes an auxiliary heater as an auxiliary heating device disposed in the vehicular air conditioning device 1 of the embodiment. The auxiliary heater 23 is constituted of a PTC heater (an electric heater) in the embodiment, and disposed in the air flow passage 3 on an air downstream side of the radiator 4 to the flow of the air in the air flow passage 3. Then, when the auxiliary heater 23 is energized to generate heat, the auxiliary heater becomes a so-called heater core to complement heating of the vehicle interior.

Additionally, in the air flow passage 3 on an air upstream side of the radiator 4, an air mix damper 28 is disposed to adjust a ratio at which the air in the air flow passage 3 (the indoor or outdoor air) flowing into the air flow passage 3 and passed through the heat absorber 9 is to be passed through the radiator 4. Furthermore, in the air flow passage 3 on an air downstream side of the auxiliary heater 23, there is formed each outlet (represented by an outlet 29 in FIG. 1) of FOOT (foot), VENT (vent) or DEF (defroster), and in the outlet 29, an outlet changing damper 31 is disposed to execute changing control of blowing of the air from each outlet mentioned above.

Furthermore, the vehicular air conditioning device 1 of the present invention is provided with a battery temperature adjustment device 61 for circulating a heat medium through the battery 55 to adjust the temperature of the battery 55. The battery temperature adjustment device 61 is provided with a circulating pump 62 to circulate the heat medium through the battery 55, and a refrigerant-heat medium heat exchanger 64. Those are connected by a heat medium pipe 68.

In the case of the present embodiment, an inlet of a heat medium flow passage 64A of the refrigerant-heat medium heat exchanger 64 is connected to a discharge side of the circulating pump 62. An output of the heat medium flow passage 64A is connected to an inlet of the battery 55. An outlet of the battery 55 is connected to a suction side of the circulating pump 62. As the heat medium used in the battery temperature adjustment device 61, for example, water, a refrigerant such as HFO-1234f, liquid such as a coolant or the like, or gas such as air or the like can be employed. Incidentally, in the embodiment, water is employed. Further, for example, a jacket structure capable of circulating the heat medium in a heat exchange relation with the battery 55 is provided around the battery 55.

When the circulating pump 62 is operated, the heat medium is circulated in the heat medium pipe 68. At this time, the heat medium discharged from the circulating pump 62 flows into the heat medium flow passage 64A of the refrigerant-hearting medium heat exchanger 64. The heat medium flowing out from the heat medium flow passage 64A of the refrigerant-heat medium heat exchanger 64 reaches the battery 55 to perform heat exchange with the battery 55 to thereby cool the battery 55, followed by being sucked into the circulating pump 62.

On the other hand, in the refrigerant pipe 13A on the refrigerant outlet side of the outdoor heat exchanger 7 (which serves as a heat exchanger for heat radiation) in the refrigerant circuit R, one end of a branch pipe 72 is connected to a part thereof before reaching the solenoid valve 17 and the solenoid valve 21. The other end of the branch pipe 72 is connected to an inlet of an auxiliary expansion valve 73 as an expansion valve of the present invention constituted of an electric valve. The auxiliary expansion valve 73 is capable of decompressing and expanding the refrigerant and also performing full closing. An outlet of the auxiliary expansion valve 73 is connected to a refrigerant flow passage 64B of the refrigerant-heat medium heat exchanger 64. One end of a refrigerant pipe 74 is connected to an output of the refrigerant flow passage 64B, and the other end of the refrigerant pipe 74 is connected to the refrigerant pipe 13C before the accumulator 12 (refrigerant upstream side). It is to be noted that these auxiliary expansion valve 73 and others also constitute a part of the refrigerant circuit R, and at the same time constitutes even a part of the battery temperature adjustment device 61.

When the auxiliary expansion valve 73 is opened, the refrigerant (some refrigerant or all refrigerant, i.e., at least part of refrigerant) flowing out from the outdoor heat exchanger 7 is decompressed in the auxiliary expansion valve 73 and then flows into the refrigerant flow passage 64B of the refrigerant-heat medium heat exchanger 64 to evaporate there. The refrigerant absorbs heat from the heat medium flowing through the heat medium flow passage 64A in the process of flowing through the refrigerant flow passage 64B and cools it, followed by being sucked into the compressor 2 through the accumulator 12.

Figure 2:
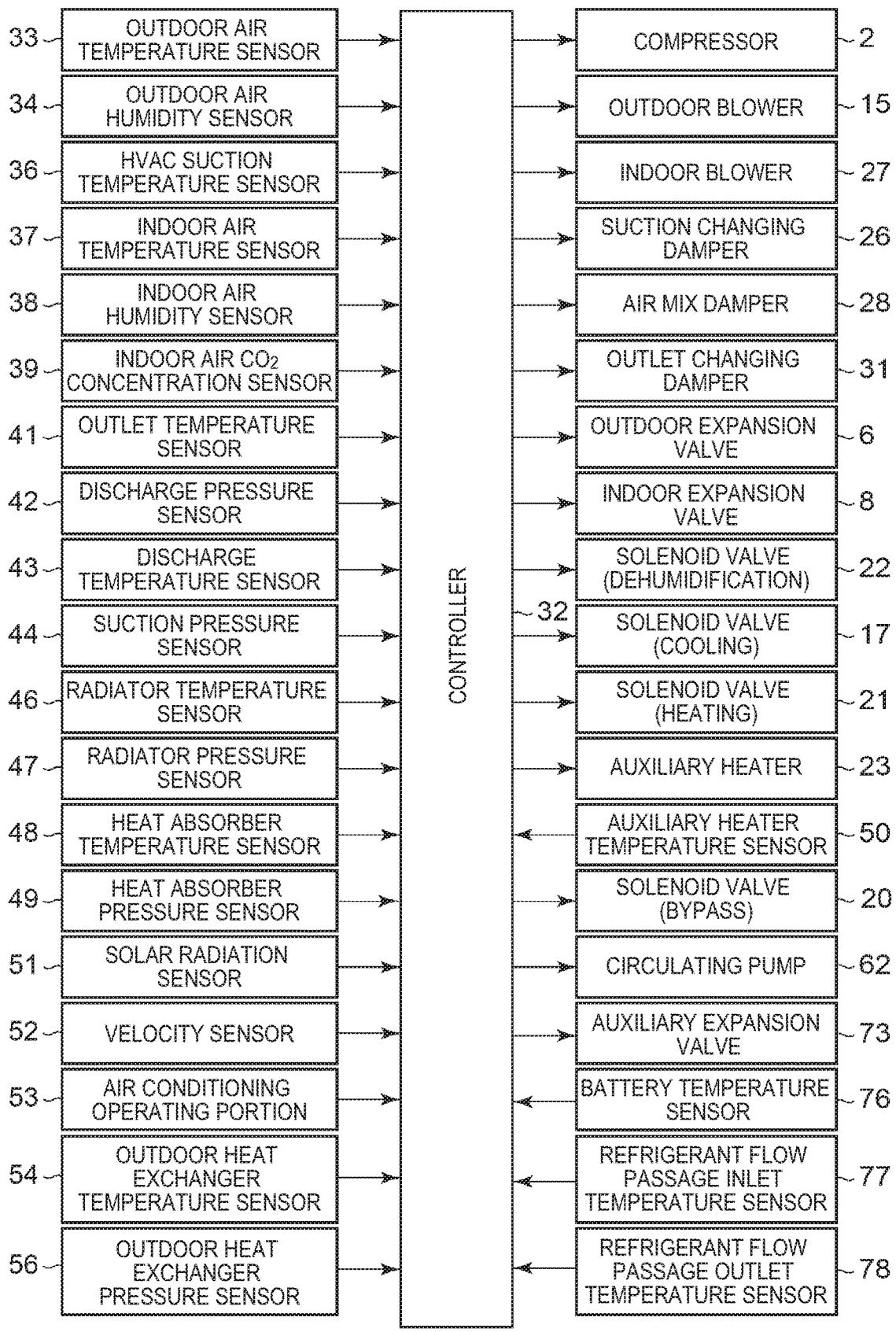
FIG. 2 is a block diagram of an electric circuit of a controller in the vehicular air conditioning device of FIG. 1.

Next, in FIG. 2, 32 is a controller (ECU) which constitutes a control device of the present invention. The controller 32 is constituted of a microcomputer that is an example of a computer including a processor, and an input of the controller is connected to respective outputs of an outdoor air temperature sensor 33 which detects an outdoor air temperature (Tam) of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out from the outlet 29 to the vehicle interior, a discharge pressure sensor 42 which detects a pressure (a discharge pressure Pd) of the refrigerant discharged from the compressor 2, a discharge temperature sensor 43 which detects a temperature of the refrigerant discharged from the compressor 2, a suction temperature sensor 44 which detects a temperature of the refrigerant to be sucked into the compressor 2, a radiator temperature sensor 46 which detects a temperature of the radiator 4 (the temperature of the air passed through the radiator 4 or the temperature of the radiator 4 itself: a radiator temperature TCI), a radiator pressure sensor 47 which detects a refrigerant pressure of the radiator 4 (the pressure of the refrigerant in the radiator 4 or immediately after the refrigerant flows out from the radiator 4: a radiator pressure PCI), a heat absorber temperature sensor 48 which detects a temperature of the heat absorber 9 (the temperature of the air passed through the heat absorber 9 or the temperature of the heat absorber 9 itself: a heat absorber temperature Te), a heat absorber pressure sensor 49 which detects a refrigerant pressure of the heat absorber 9 (the pressure of the refrigerant in the heat absorber 9 or immediately after the refrigerant flows out from the heat absorber 9), a solar radiation sensor 51 of, e.g., a photo sensor system to detect a solar radiation amount into the vehicle interior, a velocity sensor 52 to detect a moving speed (a velocity) of the vehicle, an air conditioning (aircon) operating portion 53 to set the changing of a predetermined temperature or an air conditioning operation, an outdoor heat exchanger temperature sensor 54 which detects a temperature of the outdoor heat exchanger 7 (the temperature of the refrigerant immediately after the refrigerant flows out from the outdoor heat exchanger 7, or the temperature of the outdoor heat exchanger 7 itself: an outdoor heat exchanger temperature TXO. When the outdoor heat exchanger 7 functions as a heat exchanger for heat absorption, the outdoor heat exchanger temperature TXO becomes an evaporation temperature of the refrigerant in the outdoor heat exchanger 7), and an outdoor heat exchanger pressure sensor 56 which detects a refrigerant pressure of the outdoor heat exchanger 7 (the pressure of the refrigerant in the outdoor heat exchanger 7 or immediately after the refrigerant flows out from the outdoor heat exchanger 7).

Furthermore, the input of the controller 32 is further connected also to respective outputs of an auxiliary heater temperature sensor 50 which detects a temperature of the auxiliary heater 23 (the temperature of the air passed through the auxiliary heater 23 or the temperature of the auxiliary heater 23 itself: an auxiliary heater temperature TSH), a battery temperature sensor 76 which detects a temperature Tb of the battery 55 (a temperature of the battery 55 itself or a temperature of the heat medium in the inlet of the battery 55. In the embodiment, the temperature of the heat medium in the inlet of the battery 55: a battery temperature Tb), a refrigerant flow passage inlet temperature sensor 77 which detects a temperature Tw of the refrigerant in an inlet of the refrigerant flow passage 64B of the refrigerant-heat medium heat exchanger 64 (the temperature of the refrigerant of the refrigerant-heat medium heat exchanger 64 in the present embodiment: a refrigerant-heat medium heat exchanger refrigerant temperature Tw), and a refrigerant flow passage outlet temperature sensor 78 which detects a temperature of the refrigerant in an outlet of the refrigerant flow passage 64B of the refrigerant-heat medium heat exchanger 64.

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves of the solenoid valve 22 (dehumidification), the solenoid valve 17 (cooling), the solenoid valve 21 (heating), and the solenoid valve 20 (bypass), the auxiliary heater 23, the circulating pump 62, and the auxiliary expansion valve 73. Then, the controller 32 controls these components on the basis of the outputs of the respective sensors and the setting input by the air conditioning operating portion 53.

Next, an operation of the vehicular air conditioning device 1 of the embodiment having the above constitution will be described. In the embodiment, the controller 32 changes and executes the respective operation modes of the heating mode, the dehumidifying and heating mode, the internal cycle mode, the dehumidifying and cooling mode, and the cooling mode and adjusts the temperature Tb of the battery 55 (the battery temperature Tb) to a predetermined target value TBO (target battery temperature TBO). Description will initially be made as to each operation mode of the refrigerant circuit R.

(1) Heating Mode

When the heating mode is selected by the controller 32 (an automatic mode) or a manual operation to the air conditioning operating portion 53 (a manual mode), the controller 32 opens the solenoid valve 21 (for the heating) and closes the solenoid valve 17 (for the cooling). The controller also closes the solenoid valve 22 (for the dehumidification) and the solenoid valve 20 (for the bypass).

Then, the controller operates the compressor 2 and the respective blowers 15 and 27, and the air mix damper 28 has a state of adjusting a ratio at which the air blown out from the indoor blower 27 is to be passed through the radiator 4 and the auxiliary heater 23. In consequence, a high-temperature high-pressure gas refrigerant discharged from the compressor 2 flows into the radiator 4. The air in the air flow passage 3 passes through the radiator 4, and hence the air in the air flow passage 3 is heated by the high-temperature refrigerant in the radiator 4 (by the radiator 4 and the auxiliary heater 23 when the auxiliary heater 23 operates). On the other hand, the refrigerant in the radiator 4 has the heat taken by the air and is cooled to condense and liquefy.

The refrigerant liquefied in the radiator 4 flows out from the radiator 4 and then flows through the refrigerant pipes 13E and 13J to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15 (heat absorption). In other words, the refrigerant circuit R functions as a heat pump. Then, the low-temperature refrigerant flowing out from the outdoor heat exchanger 7 flows through the refrigerant pipe 13A, the solenoid valve 21, and the refrigerant pipe 13D, and flows from the refrigerant pipe 13C into the accumulator 12 to perform gas-liquid separation, and the gas refrigerant is then sucked into the compressor 2, thereby repeating this circulation. The air heated in the radiator 4 is blown out from the outlet 29 through the auxiliary heater 23, thereby performing the heating of the vehicle interior.

The controller 32 calculates a target radiator pressure PCO (a target value of the pressure PCI of the radiator 4) from a target radiator temperature TCO (a target value of the temperature TCI of the radiator 4) calculated from an after-mentioned target outlet temperature TAO, and controls the number of revolutions NC of the compressor 2 on the basis of the target radiator pressure PCO and the refrigerant pressure of the radiator 4 which is detected by the radiator pressure sensor 47 (the radiator pressure PCI that is a high pressure of the refrigerant circuit R). Furthermore, the controller controls a valve position of the outdoor expansion valve 6 on the basis of the temperature (the radiator temperature TCI) of the radiator 4 which is detected by the radiator temperature sensor 46 and the radiator pressure PCI detected by the radiator pressure sensor 47, and controls a subcool degree (SC) of the refrigerant in an outlet of the radiator 4. The target radiator temperature TCO is basically TCO=TAO, but a predetermined limit of controlling is provided.

Furthermore, when the controller 32 judges that the heating capability by the radiator 4 runs short in the heating mode, the controller energizes the auxiliary heater 23 to generate heat, thereby executing the heating by the auxiliary heater 23. When the auxiliary heater 23 generates heat, the auxiliary heater 23 further heats the air in the air flow passage 3 which passes the radiator 4. Consequently, when the heating capability to be capable of being generated by the radiator 4 runs short to the required heating capability (calculated from a difference between the target radiator temperature TCO obtainable from the target outlet temperature TAO to be described later and the heat absorber temperature Te), the auxiliary heater 23 complements this shortage of the heating capability.

(2) Dehumidifying and Heating Mode

Next, in the dehumidifying and heating mode, the controller 32 opens the solenoid valve 22 in the above state of the heating mode. In consequence, a part of the condensed refrigerant flowing into the refrigerant pipe 13E through the radiator 4 is distributed, this part of the refrigerant flows through the solenoid valve 22 into the refrigerant pipe 13F and flows from the refrigerant pipe 13B through the internal heat exchanger 19 into the indoor expansion valve 8, and the residual refrigerant flows through the outdoor expansion valve 6. That is, the distributed part of the refrigerant is decompressed in the indoor expansion valve 8, and then flows into the heat absorber 9 to evaporate.

The controller 32 controls the valve position of the indoor expansion valve 8 to maintain a superheat degree (SH) in an outlet of the heat absorber 9 at a predetermined value, but water in the air blown out from the indoor blower 27 coagulates to adhere to the heat absorber 9 by a heat absorbing operation of the refrigerant which occurs in the heat absorber 9 at this time, and hence, the air is cooled and dehumidified. The distributed residual refrigerant flowing into the refrigerant pipe 13J is decompressed in the outdoor expansion valve 6, and then evaporates in the outdoor heat exchanger 7.

The refrigerant evaporated in the heat absorber 9 flows through the internal heat exchanger 19 to join the refrigerant (the refrigerant from the outdoor heat exchanger 7) from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4 (the radiator 4 and the auxiliary heater 23 when the auxiliary heater 23 generates heat), thereby performing the dehumidifying and heating of the vehicle interior.

The controller 32 controls the number of revolutions NC of the compressor 2 on the basis of the target radiator pressure PCO calculated from the target radiator temperature TCO and the radiator pressure PCI detected by the radiator pressure sensor 47 (the high pressure of the refrigerant circuit R), and the controller controls the valve position of the outdoor expansion valve 6 on the basis of the temperature (the heat absorber temperature Te) of the heat absorber 9 which is detected by the heat absorber temperature sensor 48.

(3) Internal Cycle Mode

Next, in the internal cycle mode, the controller 32 shuts off the outdoor expansion valve 6 in the above state of the dehumidifying and heating mode (a shutoff position), and also closes the solenoid valve 21. That is, this internal cycle mode is a state where the outdoor expansion valve 6 is shut off under the control of the outdoor expansion valve 6 in the dehumidifying and heating mode, and hence, this internal cycle mode is also grasped as a part of the dehumidifying and heating mode.

However, the outdoor expansion valve 6 and the solenoid valve 21 are closed, thereby obstructing inflow of the refrigerant into the outdoor heat exchanger 7 and outflow of the refrigerant from the outdoor heat exchanger 7, and hence, all the condensed refrigerant flowing through the radiator 4 into the refrigerant pipe 13E flows through the solenoid valve 22 to the refrigerant pipe 13F. Then, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled and dehumidified.

The refrigerant evaporated in the heat absorber 9 flows through the internal heat exchanger 19 into the refrigerant pipe 13C and flows through the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle mode, the refrigerant circulates between the radiator 4 (heat radiation) and the heat absorber 9 (heat absorption) which are present in the air flow passage 3 on an indoor side, and hence, the heat is not pumped up from the outdoor air, but the heating capability for a consumed power of the compressor 2 is exerted. The whole amount of the refrigerant flows through the heat absorber 9 which exerts a dehumidifying operation, and hence, as compared with the above dehumidifying and heating mode, a dehumidifying capability is higher, but the heating capability becomes low.

The controller 32 controls the number of revolutions NC of the compressor 2 on the basis of the temperature of the heat absorber 9 or the above-mentioned radiator pressure PCI (the high pressure of the refrigerant circuit R). At this time, the controller 32 selects a smaller compressor target number of revolutions from compressor target numbers of revolutions obtainable by either of calculations from the temperature of the heat absorber 9 and the radiator pressure PCI, to control the compressor 2.

(4) Dehumidifying and Cooling Mode (Dehumidifying Mode in the Present Invention)

Next, in the dehumidifying and cooling mode, the controller 32 opens the solenoid valve 17 and closes the solenoid valve 21. The controller also closes the solenoid valve 22 and the solenoid valve 20. Then, the controller operates the compressor 2 and the respective blowers 15 and 27, and the air mix damper 28 has a state of passing the air blown out from the indoor blower 27 through the radiator 4. Consequently, the high-temperature high-pressure gas refrigerant discharged from the compressor 2 flows into the radiator 4. The air in the air flow passage 3 passes through the radiator 4, and hence, the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15 to condense. That is, the outdoor heat exchanger 7 functions as a heat exchanger for heat radiation. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled and dehumidified.

The refrigerant evaporated in the heat absorber 9 flows through the internal heat exchanger 19 and reaches the accumulator 12 via the refrigerant pipe 13C, and flows therethrough to be sucked into the compressor 2, thereby repeating this circulation. That is, in the dehumidifying and cooling mode, the refrigerant is circulated in the order of the compressor 2, the outdoor heat exchanger 7 (the heat exchanger for heat radiation), the indoor expansion valve 8 (the pressure reducing unit), and the heat absorber 9 (the heat exchanger for heat absorption). The air cooled and dehumidified in the heat absorber 9 is reheated in the process of passing the radiator 4 (a radiation capability is lower than that during the heating), thereby performing the dehumidifying and cooling of the vehicle interior.

In the present embodiment, the controller 32 controls the number of revolutions NC of the compressor 2 on the basis of the temperature (the heat absorber temperature Te) of the heat absorber 9 which is detected by the heat absorber temperature sensor 48, also controls the valve position of the outdoor expansion valve 6 on the basis of the above-mentioned high pressure of the refrigerant circuit R, and controls the refrigerant pressure (the radiator pressure PCI) of the radiator 4.

(5) Cooling Mode

Next, in the cooling mode, the controller 32 opens the solenoid valve 20 in the above state of the dehumidifying and cooling mode (the valve position of the outdoor expansion valve 6 is free). It is to be noted that the air mix damper 28 has a state of adjusting a ratio at which the air is to be passed through the radiator 4. The auxiliary heater 23 is not energized.

In consequence, the high-temperature high-pressure gas refrigerant discharged from the compressor 2 flows into the radiator 4. The air in the air flow passage 3 is passed through the radiator 4 but its ratio becomes small (because of only reheat during the cooling). The refrigerant therefore only passes the radiator, and the refrigerant flowing out from the radiator 4 flows through the refrigerant pipe 13E to reach the outdoor expansion valve 6. At this time, the solenoid valve 20 is opened, and hence, the refrigerant flows through the solenoid valve 20 to pass the refrigerant pipe 13J, and flows into the outdoor heat exchanger 7 as it is, in which the refrigerant is cooled by the running therein or the outdoor air to pass through the outdoor blower 15, to condense and liquefy. That is, even in this case, the outdoor heat exchanger 7 functions as a heat exchanger for heat radiation. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled.

The refrigerant evaporated in the heat absorber 9 flows through the internal heat exchanger 19 and reaches the accumulator 12 via the refrigerant pipe 13C, and flows therethrough to be sucked into the compressor 2, thereby repeating this circulation. That is, even in the cooling mode, the refrigerant is circulated in the order of the compressor 2, the outdoor heat exchanger 7 (the heat exchanger for heat radiation), the indoor expansion valve 8 (the pressure reducing unit), and the heat absorber 9 (the heat exchanger for heat absorption). The air cooled and dehumidified in the heat absorber 9 is blown out from the outlet 29 to the vehicle interior without passing the radiator 4, thereby performing the cooling of the vehicle interior. In the cooling mode, the controller 32 controls the number of revolutions NC of the compressor 2 on the basis of the temperature (the heat absorber temperature Te) of the heat absorber 9 which is detected by the heat absorber temperature sensor 48 as will be described later in the present embodiment.

(6) Changing of Operation Mode

The controller 32 calculates the above-mentioned target outlet temperature TAO from an equation (I) mentioned below. The target outlet temperature TAO is a target value of the temperature of the air to be blown out from the outlet 29 to the vehicle interior.

$$TAO=(Tset-Tin) \times K + Tbal(f(Tset, SUN, Tam)) \quad (I)$$

where Tset is a predetermined temperature of the vehicle interior which is set by the air conditioning operating portion 53, Tin is a temperature of the vehicle interior air which is detected by the indoor air temperature sensor 37, K is a coefficient, and Tbal is a balance value calculated from the predetermined temperature Tset, a solar radiation amount SUN detected by the solar radiation sensor 51, and the outdoor air temperature Tam detected by the outdoor air temperature sensor 33. Furthermore, in general, the lower the outdoor air temperature Tam is, the higher the target outlet temperature TAO becomes, and the higher the outdoor air temperature Tam is, the lower the target outlet temperature becomes.

Then, the controller 32 selects any operation mode from the above respective operation modes on the basis of the outdoor air temperature Tam detected by the outdoor air temperature sensor 33 and the target outlet temperature TAO on startup. Furthermore, after the startup, the controller selects and changes the above respective operation modes in accordance with changes of environments and setting conditions such as the outdoor air temperature Tam and the target outlet temperature TAO.

(7) Cooling Control of Battery 55 (Part 1)

Next, description will be made as to an embodiment of cooling control of the battery 55 by the controller 32 while referring to FIGS. 3 through 6. As described above, when the battery 55 is charged or discharged under a high temperature, its deterioration progresses. Thus, as described above, in the cooling mode and the dehumidifying and cooling mode of the operations modes, the controller 32 of the vehicular air conditioning device 1 of the embodiment cools the battery 55 by the battery temperature adjustment device 61 while executing the corresponding operation modes.

Incidentally, the following will be described by taking for example the cooling mode, but the same applies to the dehumidifying and cooling mode too. Further, it is to be noted that since the appropriate temperature range of the battery 55 is generally from above +25° C. to below +45°, the target value (the target battery temperature TBO) of the battery temperature Tb is set to +35° C. in the embodiment.

Figure 3:
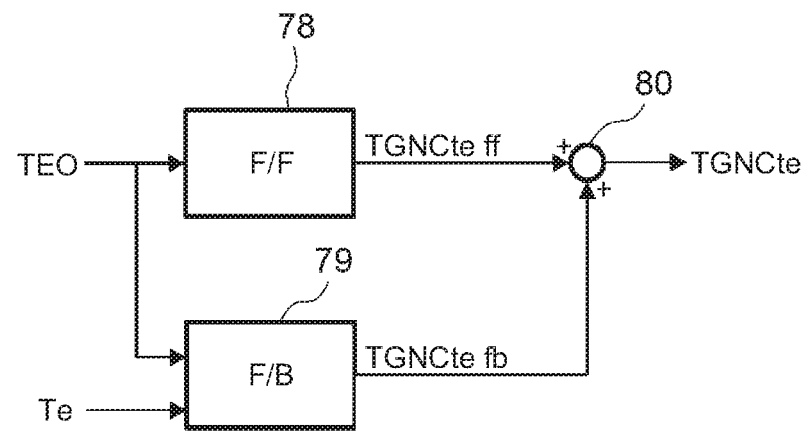
FIG. 3 is a control block diagram of an embodiment concerning compressor control by the controller of FIG. 2 in a cooling mode.

(7-1) Calculation of Compressor Target Number of Revolutions TGNCTe Based on Heat Absorber Temperature Te Next, detailed description will be made as to control of the compressor 2 based on the heat absorber temperature Te in the cooling mode using FIG. 3 (the same applies to the dehumidifying and cooling mode too). FIG. 3 is a control block diagram of the controller 32 which calculates a target number of revolutions of the compressor 2 (the compressor target number of revolutions) TGNCte on the basis of the heat absorber temperature Te detected by the heat absorber temperature sensor 48. An F/F control amount calculation section 78 of the controller 32 calculates an F/F control amount TGNCteff of the compressor target number of revolutions on the basis of a target heat absorber temperature TEO being a target value of the heat absorber temperature Te (the temperature of the heat absorber 9). Incidentally, the F/F control amount calculation section 78 may further calculate an F/F control amount TGNCteff of the compressor target number of revolutions in addition even to the outdoor air temperature Tam, a blower voltage BLV of the indoor blower 27, etc.

Furthermore, an F/B control amount calculation section 79 calculates an F/B control amount TGNCtefb of the compressor target number of revolutions on the basis of the target heat absorber temperature TEO and the heat absorber temperature Te. Then, the F/F control amount TGNCteff calculated by the F/F control amount calculation section 78 and the F/B control amount TGNCtefb calculated by the F/B control amount calculation section 79 are added in an adder 80 and then determined as the compressor target number of revolution TGNCte. The compressor target number of revolutions TGNCte is the target number of revolutions of the compressor 2 calculated based on the heat absorber temperature Te. The controller 32 controls the number of revolutions NC of the compressor 2 on the basis of the compressor target number of revolutions TGNCte.

Figure 4:
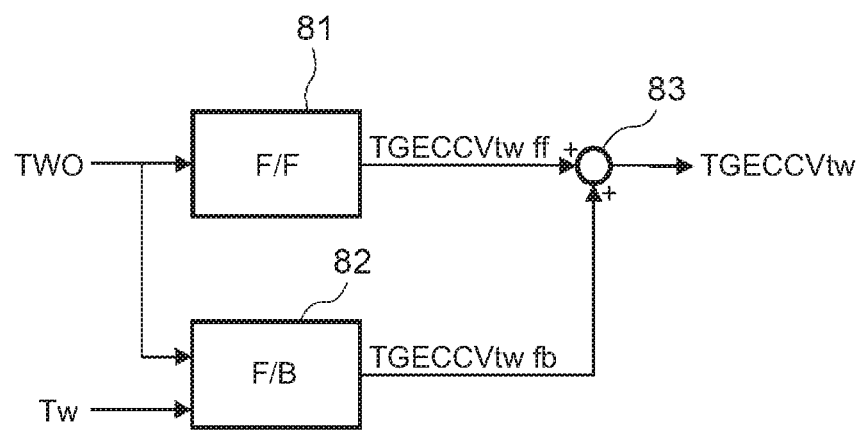
FIG. 4 is a control block diagram concerning auxiliary expansion valve control in FIG. 3.

(7-2) Calculation of Auxiliary Expansion Valve Target Valve Position TGECCVtw Based on Refrigerant-Heat Medium Heat Exchanger Refrigerant Temperature Tw Next, detailed description will be made as to control of the auxiliary expansion valve 73 based on the refrigerant-heat medium heat exchanger refrigerant temperature Tw in the cooling mode using FIG. 4 (the same applies to the dehumidifying and cooling mode too). FIG. 4 is a control block diagram of the controller 32 which calculates a target valve position (the auxiliary expansion valve target valve position) TGECCVtw of the auxiliary expansion valve 73 on the basis of the refrigerant-heat medium heat exchanger refrigerant temperature Tw detected by the refrigerant flow passage inlet temperature sensor 77. An F/F control amount calculation section 81 of the controller 32 calculates an F/F control amount TGECCVtwff of the auxiliary expansion valve target valve position on the basis of a target refrigerant-heat medium heat exchanger refrigerant temperature TWO being a target value of the refrigerant-heat medium heat exchanger refrigerant temperature Tw (the temperature of the refrigerant of the refrigerant-heat medium heat exchanger 64).

Further, an F/B control amount calculation section 82 calculates an F/B control amount TGECCVtwfb of the auxiliary expansion valve target valve position on the basis of the target refrigerant-heat medium heat exchanger refrigerant temperature TWO and the refrigerant-heat medium heat exchanger refrigerant temperature Tw. Then, the F/F control amount TGECCVtwff calculated by the F/F control amount calculation section 81 and the F/B control amount TGECCVtwfb calculated by the F/B control amount calculation section 82 are added in an adder 83 and then determined as the auxiliary expansion valve target valve position TGECCVtw. The auxiliary expansion valve target valve position TGECCVtw is the target valve position of the auxiliary expansion valve 73 calculated based on the refrigerant-heat medium heat exchanger refrigerant temperature Tw.

The controller 32 performs calculation of the above-described F/F and F/B control amounts with the target battery temperature TBO of the battery temperature Tb as the target refrigerant-heat medium heat exchanger refrigerant temperature TWO, and controls the valve position of the auxiliary expansion valve 73 on the basis of the calculated auxiliary expansion valve target valve position TGECCVtw. That is, when the refrigerant-heat medium heat exchanger refrigerant temperature Tw being the refrigerant temperature of the inlet of the refrigerant flow passage 64B of the refrigerant-heat medium heat exchanger 64 is higher than the target battery temperature TBO being the target refrigerant-heat medium heat exchanger refrigerant temperature TWO, the controller 32 expands the valve position of the auxiliary expansion valve 73 to increase the amount of the refrigerant flowing into the refrigerant flow passage 64B through the branch pipe 72. Consequently, the heat medium flowing through the heat medium flow passage 64A is forcedly cooled in the refrigerant-heat medium heat exchanger 64. With the operation of the circulating pump 62, the heat medium flowing out from the heat medium flow passage 64A of the refrigerant-heat medium heat exchanger 64 reaches the battery 55 to perform heat exchange with the battery 55, whereby the battery 55 is forcedly cooled.

On the other hand, as the refrigerant-heat medium heat exchanger refrigerant temperature Tw approaches the target battery temperature TBO (the target refrigerant-heat medium heat exchanger refrigerant temperature TWO), the controller reduces the valve position of the auxiliary expansion valve 73 to decrease the amount of the refrigerant flowing into the refrigerant flow passage 64B. Consequently, a cooling capability of the heat medium flowing through the heat medium flow passage 64A of the refrigerant-heat medium heat exchanger 64 is reduced and a cooling capability of the battery 55 is also reduced. With such control, the controller 32 adjusts the temperature of the battery 55 (the battery temperature Tb) to the target battery temperature TBO.

Figure 5:
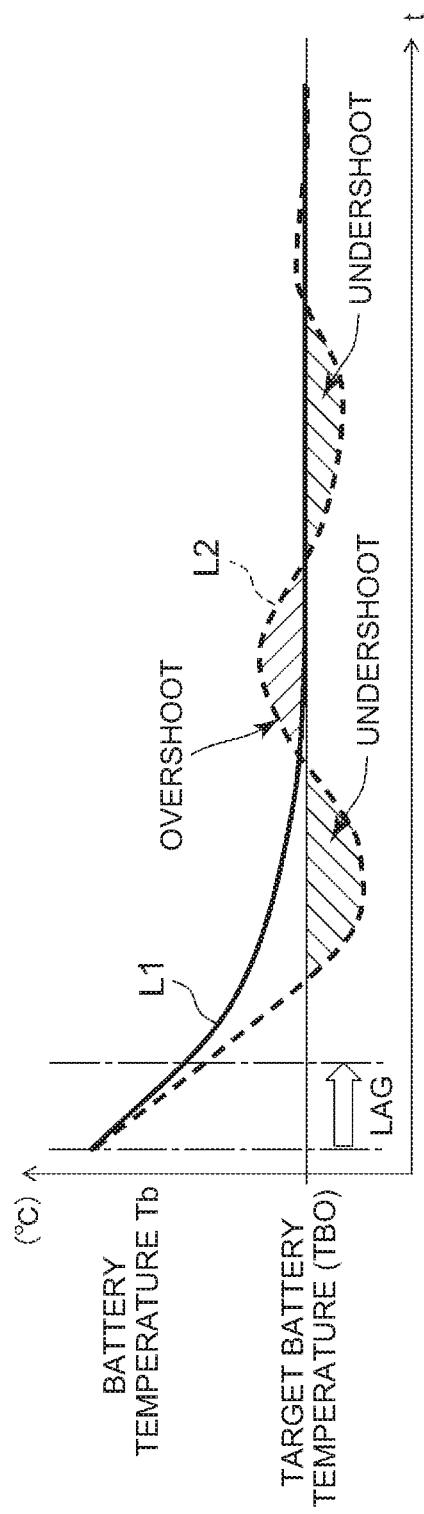
FIG. 5 is a diagram describing a change in a temperature Tb of a battery.

A solid line L1 of FIG. 5 indicates a change in the battery temperature Tb in this case. As described above, the valve position of the auxiliary expansion valve 73 is controlled by the refrigerant-heat medium heat exchanger refrigerant temperature Tw to thereby eliminate a lag in control generated by the heat medium pipe 68 or the heat capacity of the heat medium itself, whereby the battery temperature Tb is smoothly adjusted to the target battery temperature TBO. Also, since a control amount of the valve position of the auxiliary expansion valve 73 (a control amount in the opening direction/closing direction) is also prevented from greatly varying, a variation in the control amount (the number of revolutions NC) of the compressor 2 required to cool the heat medium (the battery 55) is also eliminated as indicated by a solid line L3 in FIG. 6.

Figure 6:
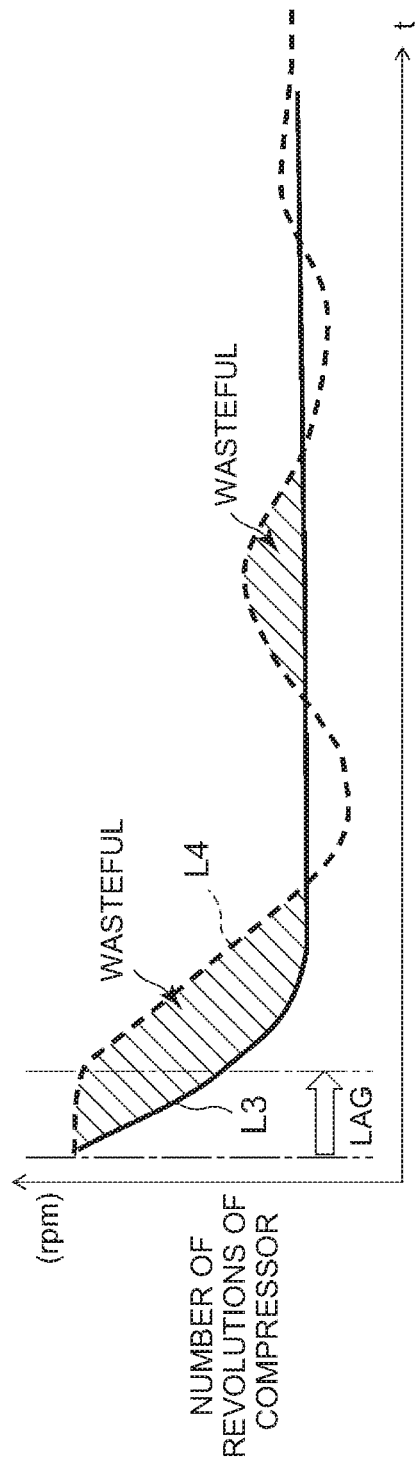
FIG. 6 is a diagram describing a change in the number of revolutions of a compressor corresponding to FIG. 5.

Further, the broken line L4 indicated in FIG. 6 as mentioned above indicates a change in the number of revolutions NC of the compressor 2 where the auxiliary expansion valve 73 is controlled at the temperature of the heat medium circulated through the battery temperature adjustment device 61, but a problem arises in that as compared with the embodiment, the number of revolutions fluctuates greatly vertically and such wasteful power consumption as indicated by hatching in FIG. 6 is consumed in the compressor 2. As in the embodiment of the present invention, however, the disadvantage that the wasteful power consumption is consumed in the compressor 2 can be eliminated by controlling the valve position of the auxiliary expansion valve 73 by the refrigerant-heat medium heat exchanger refrigerant temperature Tw.

Consequently, the battery 55 can be cooled efficiently using the refrigerant circuit R to air-condition the vehicle interior. In particular, since at least part of the refrigerant flowing out from the outdoor heat exchanger 7 is decompressed by the auxiliary expansion valve 73 and made to flow into the refrigerant flow passage 64B of the refrigerant-heat medium heat exchanger 64, the battery temperature Tb can be accurately and efficiently adjusted to the target battery temperature TBO.

(7-3) Correction Control of Target Refrigerant-Heat Medium Heat Exchanger Refrigerant Temperature TWO by Battery Temperature Tb Here, when the valve position of the auxiliary expansion valve 73 is controlled by the refrigerant-heat medium heat exchanger refrigerant temperature Tw as described above, the battery temperature Tb (the temperature of the heat medium) is reduced following the refrigerant-heat medium heat exchanger refrigerant temperature Tw, and hence, the battery temperature may not be lowered to the target battery temperature TBO for a long period in a circumstance that a heating amount of the battery 55 during its rapid charging or the like is increased.

Thus, the controller 32 corrects the target refrigerant-heat medium heat exchanger refrigerant temperature TWO on the basis of the degree of lowering of the battery temperature Tb. For example, in the embodiment, when the battery temperature Tb is not lowered to the target battery temperature TBO for a prescribed period or more, the controller performs correction to lower the target refrigerant-heat medium heat exchanger refrigerant temperature TWO from the target battery temperature TBO to a prescribed value (deg). Consequently, much refrigerant is supplied to the refrigerant flow passage 64B of the refrigerant-heat medium heat exchanger 64 and hence the heat medium flowing through the heat medium flow passage 64A is cooled more intensely. It is therefore possible to adjust the battery temperature Tb to the target battery temperature TBO more speedily.

Incidentally, the controller 32 finishes this correction in a stage in which the battery temperature Tb is lowered to the target battery temperature TBO, for example, and resets the target refrigerant-heat medium heat exchanger refrigerant temperature TWO to the target battery temperature TBO.

(7-4) Changing of Control of Compressor 2

Further, for example, when in the cooling mode, the cooling of the vehicle interior progresses and the temperature of the vehicle interior is lowered to obviate the need for cooling, a cooling load of the heat absorber 9 is also reduced. Therefore, as in the present embodiment, when the compressor target number of revolutions TGNCte is calculated based on the heat absorber temperature Te, the number of revolutions NC of the compressor 2 is also reduced and soon becomes the minimum number of revolutions of controlling. There is a risk that in the circumstance that the battery temperature Tb becomes high in such a state, the cooling capability of the battery 55 by the heat medium runs short even if the valve position of the auxiliary expansion valve 73 is enlarged to the maximum valve position of controlling.

Figure 7:
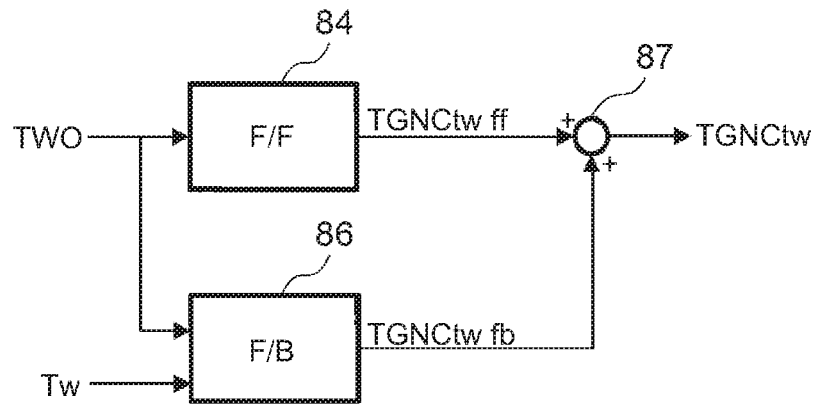
FIG. 7 is a control block diagram of another embodiment concerning compressor control by the controller of FIG. 2 in the cooling mode.

Thus, in the present embodiment, when the compressor target number of revolutions TGNCte is lowered to a predetermined low value (e.g., the minimum number of revolutions of controlling), the controller 32 performs changing to a state of closing the solenoid valve 17 to stop the supply of the refrigerant to the heat absorber 9 and controlling the number of revolutions NC of the compressor 2 by the compressor target number of revolutions TGNCtw calculated based on the refrigerant-heat medium heat exchanger refrigerant temperature Tw and the target refrigerant-heat medium heat exchanger refrigerant temperature TWO as shown in FIG. 7. Incidentally, specific control of the functional block of FIG. 7 will be described in detail later.

Further, in that case, the controller 32 performs changing to a state of controlling the valve position of the auxiliary expansion valve 73 on the basis of the temperature (Tw) of the refrigerant in the inlet of the refrigerant flow passage 64B which is detected by the refrigerant flow passage inlet temperature sensor 77 and the temperature of the refrigerant in the outlet thereof which is detected by the refrigerant flow passage outlet temperature sensor 78, to thereby adjust a refrigerant superheat degree in the outlet of the refrigerant flow passage 64B of the refrigerant-heat medium heat exchanger 64 to an appropriate value.

Thus, when the compressor target number of revolutions TGNCte is lowered to the predetermined low value where the operation of the compressor 2 is controlled by the compressor target number of revolutions TGNCte calculated based on the heat absorber temperature Te, the controller performs changing to stop the supply of the refrigerant to the heat absorber 9 and control the operation of the compressor 2 by the compressor target number of revolutions TGNCtw calculated based on the refrigerant-heat medium heat exchanger refrigerant temperature Tw. Consequently, in the circumstance that there is no need for the cooling of the vehicle interior by the heat absorber 9, the controller performs changing to a state in which the refrigerant circuit R is used only for the cooling of the battery 55, thereby making it possible to continue the cooling of the battery 55 without hindrance.

(8) Cooling Control of Battery 55 (Part 2)

Figure 8:
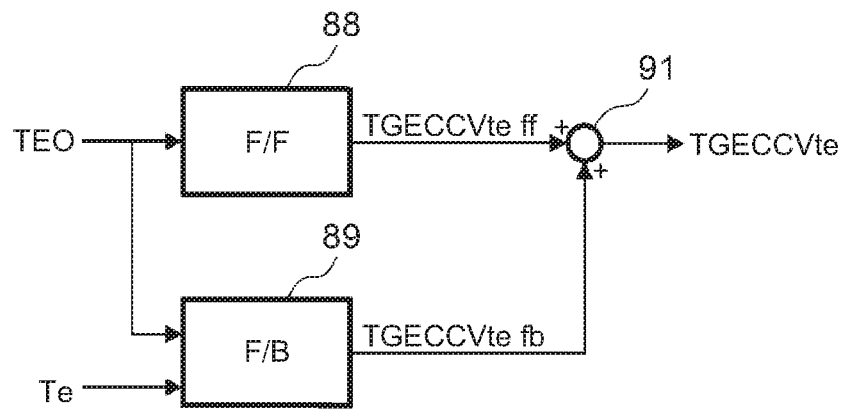
FIG. 8 is a control block diagram concerning auxiliary expansion valve control in FIG. 7.

Next, another embodiment of the cooling control of the battery 55 by the controller 32 will be described with reference to FIGS. 7 and 8. In the above embodiment, in the cooling mode (the same applies to the dehumidifying and cooling mode too), the controller controls the number of revolutions NC of the compressor 2, based on the heat absorber temperature Te, and controls the valve position of the auxiliary expansion valve 73, based on the refrigerant-heat medium heat exchanger refrigerant temperature Tw to cool the battery 55. However, the controller may control the number of revolutions NC of the compressor 2, based on the refrigerant-heat medium heat exchanger refrigerant temperature Tw and control the valve position of the auxiliary expansion valve 73, based on the heat absorber temperature Te.

Incidentally, this case will also be described by taking for example the cooling mode, but the same applies to the dehumidifying and cooling mode too. Further, even in this embodiment, the target value (the target battery temperature TBO) of the battery temperature Tb is assumed to be defined as +35° C.

(8-1) Calculation of Compressor Target Number of Revolutions TGNCtw Based on Refrigerant-Heat Medium Heat Exchanger Refrigerant Temperature Tw Next, detailed description will be made as to control of the compressor 2 based on the refrigerant-heat medium heat exchanger refrigerant temperature Tw in the cooling mode of the present embodiment (the same applies to the dehumidifying and cooling mode too) using FIG. 7. FIG. 7 is a control block diagram of the controller 32 which calculates the above-described target number of revolutions (the compressor target number of revolutions) TGNCtw of the compressor 2 on the basis of the refrigerant-heat medium heat exchanger refrigerant temperature Tw detected by the refrigerant flow passage inlet temperature sensor 77. An F/F control amount calculation section 84 of the controller 32 calculates an F/F control amount TGNCtwff of the compressor target number of revolutions on the basis of the target refrigerant-heat medium heat exchanger refrigerant temperature TWO being the target value of the refrigerant-heat medium heat exchanger refrigerant temperature Tw (the temperature of the refrigerant of the refrigerant-heat medium heat exchanger 64).

Further, an F/B control amount calculation section 86 calculates an F/B control amount TGNCtwfb of the compressor target number of revolutions on the basis of the target refrigerant-heat medium heat exchanger refrigerant temperature TWO and the refrigerant-heat medium heat exchanger refrigerant temperature Tw. Then, the F/F control amount TGNCtwff calculated by the F/F control amount calculation section 84 and the F/B control amount TGNCtwfb calculated by the F/B control amount calculation section 86 are added in an adder 87 and then determined as the compressor target number of revolutions TGNCtw. The compressor target number of revolutions TGNCtw is the target number of revolutions of the compressor 2 calculated based on the refrigerant-heat medium heat exchanger refrigerant temperature Tw.

The controller 32 performs calculation of the above-described F/F and F/B control amounts with the target battery temperature TBO of the battery temperature Tb as the target refrigerant-heat medium heat exchanger refrigerant temperature TWO, and controls the number of revolutions NC of the compressor 2 on the basis of the calculated compressor target number of revolutions TGNCtw. That is, when the refrigerant-heat medium heat exchanger refrigerant temperature Tw being the refrigerant temperature of the inlet of the refrigerant flow passage 64B of the refrigerant-heat medium heat exchanger 64 is higher than the target battery temperature TBO being the target refrigerant-heat medium heat exchanger refrigerant temperature TWO, the controller 32 raises the number of revolutions NC of the compressor 2 to increase the amount of the refrigerant flowing into the refrigerant flow passage 64B through the branch pipe 72. Consequently, the heat medium flowing through the heat medium flow passage 64A is forcedly cooled in the refrigerant-heat medium heat exchanger 64. With the operation of the circulating pump 62, the heat medium flowing out from the heat medium flow passage 64A of the refrigerant-heat medium heat exchanger 64 reaches the battery 55 to perform heat exchange with the battery 55, whereby the battery 55 is forcedly cooled.

On the other hand, as the refrigerant-heat medium heat exchanger refrigerant temperature Tw approaches the target battery temperature TBO (the target refrigerant-heat medium heat exchanger refrigerant temperature TWO), the controller reduces the number of revolutions NC of the compressor 2 to decrease the amount of the refrigerant flowing into the refrigerant flow passage 64B. Consequently, a cooling capability of the heat medium flowing through the heat medium flow passage 64A of the refrigerant-heat medium heat exchanger 64 is reduced, and a cooling capability of the battery 55 is also reduced. With such control, the controller 32 adjusts the temperature of the battery 55 (the battery temperature Tb) to the target battery temperature TBO.

As described above, the number of revolutions NC of the compressor 2 is controlled by the refrigerant-heat medium heat exchanger refrigerant temperature Tw to thereby eliminate a lag in control generated by the heat medium pipe 68 or the heat capacity of the heat medium itself even in the case of the present embodiment, whereby the battery temperature Tb is smoothly adjusted to the target battery temperature TBO as indicated by the solid line L1 in FIG. 5. Further, since the number of revolutions NC of the compressor 2 is also prevented from greatly varying, a variation in the control amount (the number of revolutions NC) of the compressor 2 required to cool the heat medium (the battery 55) is also eliminated similarly as indicated by the solid line L3 in FIG. 6.

Further, similarly, as in the present embodiment, the disadvantage that the wasteful power consumption is consumed in the compressor 2 can be eliminated by controlling the number of revolutions NC of the compressor 2 by the refrigerant-heat medium heat exchanger refrigerant temperature Tw. Consequently, the battery 55 can be cooled efficiently using the refrigerant circuit R to air-condition the vehicle interior. In particular, since at least part of the refrigerant flowing out from the outdoor heat exchanger 7 is decompressed by the auxiliary expansion valve 73 and made to flow into the refrigerant flow passage 64B of the refrigerant-heat medium heat exchanger 64, the battery temperature Tb can be accurately and efficiently adjusted to the target battery temperature TBO.

(8-2) Calculation of Auxiliary Expansion Valve Target Valve Position TGECCVte Based on Heat Absorber Temperature Te Next, detailed description will be made as to control of the auxiliary expansion valve 73 based on the heat absorber temperature Te in the cooling mode (the same applies to the dehumidifying and cooling mode too) of the present embodiment using FIG. 8. FIG. 8 is a control block diagram of the controller 32 which calculates the target valve position (the auxiliary expansion valve target valve position) TGECCVte of the auxiliary expansion valve 73 on the basis of the heat absorber temperature Te detected by the heat absorber temperature sensor 48. An F/F control amount calculation section 88 of the controller 32 calculates an F/F control amount TGECCVteff of the auxiliary expansion valve target valve position on the basis of the target heat absorber temperature TEO being the target value of the heat absorber temperature Te (the temperature of the heat absorber 9). Incidentally, the F/F control amount calculation section 88 may further calculate the F/F control amount TGECCVteff of the auxiliary expansion valve target valve position in addition to even the outdoor air temperature Tam, the blower voltage BLV of the indoor blower 27, etc.

Furthermore, an F/B control amount calculation section 89 calculates an F/B control amount TGECCVtefb of the auxiliary expansion valve target valve position on the basis of the target heat absorber temperature TEO and the heat absorber temperature Te. Then, the F/F control amount TGECCVteff calculated by the F/F control amount calculation section 88 and the F/B control amount TGECCVtefb calculated by the F/B control amount calculation section 89 are added in an adder 91 and then determined as the auxiliary expansion valve target valve position TGECCVte. The auxiliary expansion valve target valve position TGECCVte is the target valve position of the auxiliary expansion valve 73 calculated based on the heat absorber temperature Te.

The controller 32 controls the valve position of the auxiliary expansion valve 73 on the basis of the calculated auxiliary expansion valve target valve position TGECCVte. That is, when the heat absorber temperature Te is higher than the target heat absorber temperature TEO, the controller 32 reduces the valve position of the auxiliary expansion valve 73 to increase the amount of the refrigerant flowing into the heat absorber 9 through the solenoid valve 17. On the other hand, as the heat absorber temperature Te approaches the target heat absorber temperature TEO, the controller enlarges the valve position of the auxiliary expansion valve 73 to decrease the amount of the refrigerant flowing into the heat absorber 9 through the solenoid valve 17.

Even in the case of the present embodiment, it is to be noted that the controller 32 corrects the target refrigerant-heat medium heat exchanger refrigerant temperature TWO on the basis of the degree of lowering of the battery temperature Tb in a manner similar to the above.

(8-3) Changing of Control of Compressor 2

Further, even in the case of the present embodiment, when the temperature of the battery 55 is lowered to obviate the need for cooling of the battery 55, a cooling load of the refrigerant-heat medium heat exchanger 64 is also reduced. Therefore, as in the present embodiment, when the compressor target number of revolutions TGNCtw is calculated based on the refrigerant-heat medium heat exchanger refrigerant temperature Tw, the number of revolutions NC of the compressor 2 is also reduced and soon becomes the minimum number of revolutions of controlling. There is a risk that in the circumstance that the temperature in the vehicle interior becomes high in such a state, the cooling capability by the heat absorber 9 runs short even if the valve position of the auxiliary expansion valve 73 is reduced to the minimum valve position of controlling.

Thus, in the present embodiment, when the compressor target number of revolutions TGNCtw is lowered to a predetermined low value (e.g., the minimum number of revolutions of controlling), the controller 32 performs changing to a state of fully closing the auxiliary expansion valve 73 to stop the supply of the refrigerant to the refrigerant-heat medium heat exchanger 64 and controlling the number of revolutions NC of the compressor 2 by the compressor target number of revolutions TGNCte calculated based on the heat absorber temperature Te and the target heat absorber temperature TEO as shown in FIG. 3 mentioned above. The controller may stop the circulating pump 62 when the auxiliary expansion valve 73 is fully closed, and may always operate the circulating pump 62 while the vehicular air conditioning device 1 is in operation.

Thus, when the compressor target number of revolutions TGNCtw is lowered to the predetermined low value where the operation of the compressor 2 is controlled by the compressor target number of revolutions TGNCtw calculated based on the refrigerant-heat medium heat exchanger refrigerant temperature Tw, the controller performs changing to stop the supply of the refrigerant to the refrigerant-heat medium heat exchanger 64 and control the operation of the compressor 2 by the compressor target number of revolutions TGNCte calculated based on the heat absorber temperature Te. Consequently, in the circumstance that there is no need for the cooling of the battery 55 through the heat medium by the refrigerant-heat medium heat exchanger 64, the controller performs changing to a state in which the refrigerant circuit R is used only for the cooling of the vehicle interior, thereby making it possible to continue the air conditioning of the vehicle interior without hindrance.

(9) Cooling Control of Battery 55 (Part 3)

Next, a further embodiment of the cooling control of the battery 55 by the controller 32 will be described with reference to FIG. 9. In the embodiment (part 1), in the cooling mode, the number of revolutions NC of the compressor 2 is controlled based on the heat absorber temperature Te, and the valve position of the auxiliary expansion valve 73 is controlled based on the refrigerant-heat medium heat exchanger refrigerant temperature Tw to cool the battery 55. In the above embodiment (part 2), the number of revolutions NC of the compressor 2 is controlled based on the refrigerant-heat medium heat exchanger refrigerant temperature Tw, and the valve position of the auxiliary expansion valve 73 is controlled based on the heat absorber temperature Te to cool the battery 55. However, the controller may select a smaller compressor target number of revolutions from the compressor target number of revolutions TGNCte based on the heat absorber temperature Te calculated in the control block of FIG. 3, and the compressor target number of revolutions TGNCtw based on the refrigerant-heat medium heat exchanger refrigerant temperature Tw calculated in the control block of FIG. 7 to control the number of revolutions NC of the compressor 2.

(9-1) Calculation of Compressor Target Number of Revolutions TGNC and Control of Compressor 2

Figure 9:
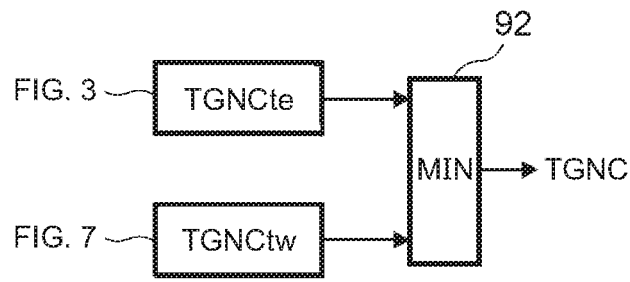
FIG. 9 is a control block diagram of a further embodiment concerning compressor control by the controller of FIG. 2 in the cooling mode.

In that case, as shown in FIG. 9, the compressor target number of revolutions TGNCte calculated in the control block of FIG. 3, and the compressor target number of revolutions TGNCtw calculated in the control block of FIG. 7 are compared by a comparator 92, and the smaller one of these is selected and determined as the final compressor target number of revolutions TGNC. Then, the number of revolutions NC of the compressor 2 is controlled based on the compressor target number of revolutions TGNC. A method for its control is similar to the case of each embodiment mentioned above.

(9-2) Control of Auxiliary Expansion Valve 73

Further, the controller 32 in that case controls the valve position of the auxiliary expansion valve 73 on the basis of the refrigerant-heat medium heat exchanger refrigerant temperature Tw or the heat absorber temperature Te, which is not selected for the operation control of the compressor 2. That is, when the compressor target number of revolutions TGNCte of FIG. 3 is selected as the compressor target number of revolutions TGNC, the valve position of the auxiliary expansion valve 73 is controlled based on the auxiliary expansion valve target valve position TGECCVtw calculated in the control block of FIG. 4. When the compressor target number of revolutions TGNCtw of FIG. 7 is selected, the valve position of the auxiliary expansion valve 73 is controlled based on the auxiliary expansion valve target valve position TGECCVte calculated in the control block of FIG. 8.

Thus, if the controller 32 selects the smaller one of the compressor target number of revolutions TGNCte calculated based on the heat absorber temperature Te and the compressor target number of revolutions TGNCtw calculated based on the refrigerant-heat medium heat exchanger refrigerant temperature Tw to control the operation of the compressor 2, the controller is capable of controlling the valve position of the auxiliary expansion valve 73 on the basis of the refrigerant-heat medium heat exchanger refrigerant temperature Tw unselected for the operation control of the compressor 2 or the heat absorber temperature Te while reducing power consumption of the compressor 2 to thereby perform air conditioning of the vehicle interior and the cooling of the battery 55 without hindrance.

Incidentally, in each embodiment described above, the temperature of the refrigerant in the inlet of the refrigerant flow passage 64B of the refrigerant-heat medium heat exchanger 64 which is detected by the refrigerant flow passage inlet temperature sensor 77 is adopted as the refrigerant-heat medium heat exchanger refrigerant temperature Tw, but not limited thereto. The temperature of the refrigerant in the outlet of the refrigerant flow passage 64B of the refrigerant-heat medium heat exchanger 64 which is detected by the refrigerant flow passage outlet temperature sensor 78 may be adopted.

Further, the refrigerant-heat medium heat exchanger refrigerant temperature Tw is not limited to the temperature directly detected by the refrigerant flow passage inlet temperature sensor 77 or the refrigerant flow passage outlet temperature sensor 78. A pressure of the refrigerant in the inlet of the refrigerant flow passage 64B of the refrigerant-heat medium heat exchanger 64 or a pressure of the refrigerant in the outlet of the refrigerant flow passage 64B is detected by a pressure sensor, and a value (temperature) obtained by converting the detected pressure to a temperature may be adopted.

Furthermore, the constitutions of the refrigerant circuit R and the battery temperature adjustment device 61 described in each embodiment mentioned above are not limited thereto, and is needless to say changeable within the scope not departing from the gist of the present invention. For example, the embodiment has described the vehicular air conditioning device 1 which cools the battery 55 in the cooling mode and the dehumidifying and cooling mode, but is not limited thereto in the inventions of claims 1 to 3. If at least part of the refrigerant discharged from the radiator 4 is made to flow into the refrigerant flow passage 64B of the refrigerant-heat medium heat exchanger 64 through the auxiliary expansion valve 73 with the radiator 4 as the heat exchanger for heat radiation in the present invention, the outdoor expansion valve 6 as the pressure reducing unit in the present invention, and the outdoor heat exchanger 7 as the heat exchanger for heat absorption in the present invention, the battery 55 can be cooled by the refrigerant circuit R through the heat medium in the aforementioned heating mode and dehumidifying and heating mode. Even in that case, it is needless to say that the compressor 2 and the auxiliary expansion valve 73 are controlled based on the temperature of the refrigerant of the refrigerant-heat medium heat exchanger 64.

DESCRIPTION OF REFERENCE NUMERALS

1 vehicular air conditioning device
2 compressor
3 air flow passage
4 radiator
6 outdoor expansion valve
7 outdoor heat exchanger (heat exchanger for heat radiation)
8 indoor expansion valve (pressure reducing unit)
9 heat absorber (heat exchanger for heat absorption)
15 outdoor blower
17, 20, 21, 22 solenoid valve (opening/closing valve)
32 controller (control device)
55 battery
61 battery temperature adjustment device
62 circulating pump
64 refrigerant-heat medium heat exchanger
73 auxiliary expansion valve (expansion valve)
R refrigerant circuit.

The invention claimed is:

1. A vehicular air conditioning device to condition air of a vehicle interior, including a refrigerant circuit to let a refrigerant circulate in the order of a compressor, a heat exchanger for heat radiation, a pressure reducing unit, and a heat exchanger for heat absorption, and a control device, comprising:
   a battery temperature adjustment device to circulate a heat medium through a battery mounted in a vehicle, thereby cooling the battery;
   a refrigerant-heat medium heat exchanger to exchange heat between at least part of the refrigerant flowing out from the heat exchanger for heat radiation and the heat medium of the battery temperature adjustment device, and
   an expansion valve to decompress the refrigerant flowing into the refrigerant-heat medium heat exchanger,
   wherein the control device controls the compressor or the expansion valve on the basis of a temperature Tw of the refrigerant of the refrigerant-heat medium heat exchanger to thereby adjust a temperature Tb of the battery to a predetermined target value TBO,
   wherein the control device sets the target value TBO of the temperature Tb of the battery as a target value TWO of the temperature Tw of the refrigerant of the refrigerant-heat medium heat exchanger, and controls the compressor or the expansion valve on the basis of the target value TWO and the temperature Tw of the refrigerant of the refrigerant-heat medium heat exchanger, and
   wherein the control device corrects the target value TWO of the temperature Tw of the refrigerant of the refrigerant-heat medium heat exchanger on the basis of the degree of lowering of the temperature Tb of the battery.

2. The vehicular air conditioning device according to claim 1, wherein the control device sets a temperature of the refrigerant in an inlet of the refrigerant-heat medium heat exchanger or a temperature converted from a pressure of the refrigerant in the inlet of the refrigerant-heat medium heat exchanger, or a temperature of the refrigerant in an outlet of the refrigerant-heat medium heat exchanger or a temperature converted from a pressure of the refrigerant in the outlet of the refrigerant-heat medium heat exchanger as the temperature Tw of the refrigerant of the refrigerant-heat medium heat exchanger.

3. A vehicular air conditioning device to condition air of a vehicle interior, including a refrigerant circuit to let a refrigerant circulate in the order of a compressor, a heat exchanger for heat radiation, a pressure reducing unit, and a heat exchanger for heat absorption, and a control device, comprising:
   a battery temperature adjustment device to circulate a heat medium through a battery mounted in a vehicle, thereby cooling the battery;
   a refrigerant-heat medium heat exchanger to exchange heat between at least part of the refrigerant flowing out from the heat exchanger for heat radiation and the heat medium of the battery temperature adjustment device;
   an expansion valve to decompress the refrigerant flowing into the refrigerant-heat medium heat exchanger,
   wherein the control device controls the compressor or the expansion valve on the basis of a temperature Tw of the refrigerant of the refrigerant-heat medium heat exchanger to thereby adjust a temperature Tb of the battery to a predetermined target value TBO;

an air flow passage through which air to be supplied to the vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, and an outdoor heat exchanger disposed outside the vehicle interior to let the refrigerant radiate or absorb heat, wherein the control device executes:

a heating mode to let the refrigerant discharged from the compressor radiate heat in the radiator, decompress the refrigerant from which the heat has been radiated, and then let the refrigerant absorb heat in the outdoor heat exchanger, thereby heating the vehicle interior, a dehumidifying mode to let the refrigerant discharged from the compressor radiate heat in the radiator and the outdoor heat exchanger, decompress the refrigerant from which the heat has been radiated, and then let the refrigerant absorb heat in the heat absorber, thereby dehumidifying the vehicle interior, and a cooling mode to let the refrigerant discharged from the compressor radiate heat in the outdoor heat exchanger, decompress the refrigerant from which the heat has been radiated, and then let the refrigerant absorb heat in the heat absorber, thereby cooling the vehicle interior, and wherein in the cooling mode and/or the dehumidifying mode, the heat absorber constitutes the heat exchanger for heat absorption, the outdoor heat exchanger constitutes the heat exchanger for heat radiation, and at least part of the refrigerant flowing out from the outdoor heat exchanger is decompressed in the expansion valve and made to flow into the refrigerant-heat medium heat exchanger.

4. A vehicular air conditioning device to condition air of a vehicle interior, including a refrigerant circuit to let a refrigerant circulate in the order of a compressor, a heat exchanger for heat radiation, a pressure reducing unit, and a heat exchanger for heat absorption, and a control device, comprising:

a battery temperature adjustment device to circulate a heat medium through a battery mounted in a vehicle, thereby cooling the battery;

a refrigerant-heat medium heat exchanger to exchange heat between at least part of the refrigerant flowing out from the heat exchanger for heat radiation and the heat medium of the battery temperature adjustment device; and an expansion valve to decompress the refrigerant flowing into the refrigerant-heat medium heat exchanger, wherein the control device controls the compressor or the expansion valve on the basis of a temperature Tw of the refrigerant of the refrigerant-heat medium heat exchanger to thereby adjust a temperature Tb of the batter to a predetermined target value TBO, and wherein the control device controls an operation of the compressor on the basis of a temperature Te of the heat exchanger for heat absorption, and controls a valve position of the expansion valve on the basis of the temperature Tw of the refrigerant of the refrigerant-heat medium heat exchanger.

5. The vehicular air conditioning device according to claim 4, wherein the control device controls the operation of the compressor according to a target number of revolutions TGNCte of the compressor calculated based on the temperature Te of the heat exchanger for heat absorption, and wherein when the target number of revolutions TGNCte is lowered to a predetermined low value, the control device stops the supply of the refrigerant to the heat exchanger for heat absorption, and controls the operation of the compressor according to a target number of revolutions TGNCtw of the compressor calculated based on the temperature Tw of the refrigerant of the refrigerant-heat medium heat exchanger.

6. A vehicular air conditioning device to condition air of a vehicle interior, including a refrigerant circuit to let a refrigerant circulate in the order of a compressor, a heat exchanger for heat radiation, a pressure reducing unit, and a heat exchanger for heat absorption, and a control device, comprising:

a battery temperature adjustment device to circulate a heat medium through a battery mounted in a vehicle, thereby cooling the battery, a refrigerant-heat medium heat exchanger to exchange heat between at least part of the refrigerant flowing out from the heat exchanger for heat radiation and the heat medium of the battery temperature adjustment device; and an expansion valve to decompress the refrigerant flowing into the refrigerant-heat medium heat exchanger, wherein the control device controls the compressor or the expansion valve on the basis of a temperature Tw of the refrigerant of the refrigerant-heat medium heat exchanger to thereby adjust a temperature Tb of the battery to a predetermined target value TBO, and wherein the control device controls the operation of the compressor on the basis of the temperature Tw of the refrigerant of the refrigerant-heat medium heat exchanger, and controls the valve position of the expansion valve on the basis of the temperature Te of the heat exchanger for heat absorption.

7. The vehicular air conditioning device according to claim 6, wherein the control device controls the operation of the compressor according to the target number of revolutions TGNCtw of the compressor calculated based on the temperature Tw of the refrigerant of the refrigerant-heat medium heat exchanger, and wherein when the target number of revolutions TGNCtw is lowered to a predetermined low value, the control device stops the supply of the refrigerant to the refrigerant-heat medium heat exchanger, and controls the operation of the compressor according to the target number of revolutions TGNCte of the compressor calculated based on the temperature Te of the heat exchanger for heat absorption.

8. A vehicular air conditioning device to condition air of a vehicle interior, including a refrigerant circuit to let a refrigerant circulate in the order of a compressor, a heat exchanger for heat radiation, a pressure reducing unit, and a heat exchanger for heat absorption, and a control device, comprising:

a battery temperature adjustment device to circulate a heat medium through a battery mounted in a vehicle, thereby cooling the battery;

a refrigerant-heat medium heat exchanger to exchange heat between at least part of the refrigerant flowing out from the heat exchanger for heat radiation and the heat medium of the battery temperature adjustment device; and an expansion valve to decompress the refrigerant flowing into the refrigerant-heat medium heat exchanger, wherein the control device controls the compressor or the expansion valve on the basis of a temperature Tw of the refrigerant of the refrigerant-heat medium heat exchanger to thereby adjust a temperature Tb of the battery to a predetermined target value TBO, wherein the control device selects a smaller number of revolutions from the target number of revolutions TGNCte of the compressor calculated based on the temperature Te of the heat exchanger for heat absorption, and the target number of revolutions TGNCtw of the compressor calculated based on the temperature Tw of the refrigerant of the refrigerant-heat medium heat exchanger to control the operation of the compressor, and wherein the control device controls the valve position of the expansion valve on the basis of the temperature Tw of the refrigerant of the refrigerant-heat medium heat exchanger or the temperature Te of the heat exchanger for heat absorption, which is not selected for the operation control of the compressor.

9. The vehicular air conditioning device according to claim 3, wherein the control device sets a temperature of the refrigerant in an inlet of the refrigerant-heat medium heat exchanger or a temperature converted from a pressure of the refrigerant in the inlet of the refrigerant-heat medium heat exchanger, or a temperature of the refrigerant in an outlet of the refrigerant-heat medium heat exchanger or a temperature converted from a pressure of the refrigerant in the outlet of the refrigerant-heat medium heat exchanger as the temperature Tw of the refrigerant of the refrigerant-heat medium heat exchanger.

10. The vehicular air conditioning device according to claim 4, wherein the control device sets a temperature of the refrigerant in an inlet of the refrigerant-heat medium heat exchanger or a temperature converted from a pressure of the refrigerant in the inlet of the refrigerant-heat medium heat exchanger, or a temperature of the refrigerant in an outlet of the refrigerant-heat medium heat exchanger or a temperature converted from a pressure of the refrigerant in the outlet of the refrigerant-heat medium heat exchanger as the temperature Tw of the refrigerant of the refrigerant-heat medium heat exchanger.

11. The vehicular air conditioning device according to claim 5, wherein the control device sets a temperature of the refrigerant in an inlet of the refrigerant-heat medium heat exchanger or a temperature converted from a pressure of the refrigerant in the inlet of the refrigerant-heat medium heat exchanger, or a temperature of the refrigerant in an outlet of the refrigerant-heat medium heat exchanger or a temperature converted from a pressure of the refrigerant in the outlet of the refrigerant-heat medium heat exchanger as the temperature Tw of the refrigerant of the refrigerant-heat medium heat exchanger.

12. The vehicular air conditioning device according to claim 6, wherein the control device sets a temperature of the refrigerant in an inlet of the refrigerant-heat medium heat exchanger or a temperature converted from a pressure of the refrigerant in the inlet of the refrigerant-heat medium heat exchanger, or a temperature of the refrigerant in an outlet of the refrigerant-heat medium heat exchanger or a temperature converted from a pressure of the refrigerant in the outlet of the refrigerant-heat medium heat exchanger as the temperature Tw of the refrigerant of the refrigerant-heat medium heat exchanger.

13. The vehicular air conditioning device according to claim 7, wherein the control device sets a temperature of the refrigerant in an inlet of the refrigerant-heat medium heat exchanger or a temperature converted from a pressure of the refrigerant in the inlet of the refrigerant-heat medium heat exchanger, or a temperature of the refrigerant in an outlet of the refrigerant-heat medium heat exchanger or a temperature converted from a pressure of the refrigerant in the outlet of the refrigerant-heat medium heat exchanger as the temperature Tw of the refrigerant of the refrigerant-heat medium heat exchanger.

14. The vehicular air conditioning device according to claim 8, wherein the control device sets a temperature of the refrigerant in an inlet of the refrigerant-heat medium heat exchanger or a temperature converted from a pressure of the refrigerant in the inlet of the refrigerant-heat medium heat exchanger, or a temperature of the refrigerant in an outlet of the refrigerant-heat medium heat exchanger or a temperature converted from a pressure of the refrigerant in the outlet of the refrigerant-heat medium heat exchanger as the temperature Tw of the refrigerant of the refrigerant-heat medium heat exchanger.

\* \* \* \* \*